United States Patent [19]

Fikentscher et al.

[11] Patent Number: 4,952,332

[45] Date of Patent: Aug. 28, 1990

[54] DETERGENTS THAT CONTAIN ACYL DERIVATIVES OF DIHYDROXYDIOXANE AS BLEACH ACTIVATORS

[75] Inventors: Rolf Fikentscher, Ludwigshafen; Alfred Oftring, Bad Duerkheim; Werner Bochnitschek; Gerold Braun, both of Ludwigshafen; Johannes Perner, Neustadt; Ulrich Kaluza, Neckargemuend; Hans-Ulrich Jaeger, Neustadt, all of Fed. Rep. of Germany

[73] Assignee: BASF Aktiengesellschaft, Ludwigshafen, Fed. Rep. of Germany

[21] Appl. No.: 397,890

[22] Filed: Aug. 24, 1989

[30] Foreign Application Priority Data

Sep. 6, 1988 [DE] Fed. Rep. of Germany ....... 3830213

[51] Int. Cl.[5] ........................ C11D 7/54; C11D 7/38; C11D 3/395; C01B 15/10

[52] U.S. Cl. ........................................ 252/95; 252/74; 252/77; 252/186.38; 252/186.39; 252/186.4

[58] Field of Search ................ 252/94, 95, 99, 186.38, 252/186.39, 186.4; 549/379

[56] References Cited

U.S. PATENT DOCUMENTS 3,291,624 12/1966 Jeffreys et al. .

4,102,903 7/1978 Crutchfield .......................... 252/99

4,158,635 6/1979 Crutchfield .......................... 252/99

4,182,718 1/1980 Crutchfield ......................... 252/108

OTHER PUBLICATIONS

J. Amer. Chem. Soc., vol. 55, 1933, pp. 1284–1289, J. Boeseken, et al., "Derivatives of Dioxane".

J. Amer. Chem. Soc., vol. 77, 1955, pp. 1285–1286, O. C. Dermer, et al., "Glyoxal Acetals".

Tetrahedron, vol. 40, 1984, pp. 2011–2021, B. Fuchs, et al., "Structure and Conformation of Heterocycles. 13[1]. Conformational Analysis of 2,3-DI(R)OXY-1,4-Dioxanes:Anomeric and Gauche Effects".

*Primary Examiner*—Paul Lieberman

*Assistant Examiner*—Alexander Ghyka

*Attorney, Agent, or Firm*—Oblon, Spivak, McClelland, Maier & Neustadt

[57] ABSTRACT

Pulverulent or water-free liquid detergents each essentially contain surfactants, builders, bleaching agents and effective amounts of compounds of the formula

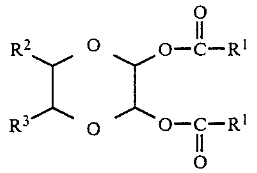

(I)

where $R^1$ is for example $C_1$-$C_8$-alkyl, substituted or unsubstituted alkyl or $C_3$-$C_8$-alkenyl, and $R^2$ and $R^3$ are each for example H or $C_1$-$C_{16}$-alkyl, as bleach activators for peroxides.

4 Claims, No Drawings

DETERGENTS THAT CONTAIN ACYL DERIVATIVES OF DIHYDROXYDIOXANE AS BLEACH ACTIVATORS

Customary detergents contain peroxides, such as sodium perborate, as bleaching agents. Bleaching with these typical bleaching agents requires temperatures of about 80°-85° C. Providing these high temperatures consumes a relatively large amount of energy and can lead to fiber damage and, in the case of dyed textiles, to loss of dye. Since peroxides react only slowly at desirable lower temperatures, such as 40°-60° C., peroxide-containing detergents also contain bleach activators as additives.

The most commonly used bleach activators include peracetylated compounds of polyamines, such as tetraacetylethylenediamine (TAED), or of polyols, such as pentaacetyl glucose (PAG). In practice, TAED sets the standard. However, it has the disadvantage of being a nitrogenous compound, which should ideally be avoided on account of the eutrofication of natural waters through nitrogenous degradation products. Of the four acetyl groups in the molecule, only two acetyl groups are sufficiently reactive to serve as peroxide activators. In the case of nitrogen-free PAG, on average only two and a half of the five acetyl groups are utilizable for peroxide activation. The sodium salt of isononanoyloxybenzenesulfonic acid, which has been used for example as a bleach activator, has the well-known disadvantage of phenol derivatives and, what is more, being a phenolsulfonic acid derivative, is not easy to produce industrially.

U.S. Pat. No. 3,291,624 discloses using acetylated derivatives of dialdehyde hemiacetals, for example 2,3-diacetoxy-1,4-dioxane, as hardeners for gelatin preparations in films in place of formaldehyde. This 2,3-diacetoxy-1,4-dioxane is obtained from 2,3-dichlorodioxane by reaction with potassium acetate in glacial acetic acid; cf. Boeseken et al., J. Amer. Chem. Soc. 55 (1933), 1284 ff. Such a process is not easy to carry out industrially on account of the hydrochloric acid to be neutralized.

J. Amer. Chem. Soc. 77 (1955), 1285 ff, discloses that the reaction of 1-butanol with aqueous solutions of glyoxal which contain ethylene glycol in the presence of acids gives 2,3-di-n-butoxy-1,4-dioxane. It is also known from Tetrahedron 40 (1984), 2011 ff, that 2,3-dihydroxy-1,4-dioxane can be converted by the action of acetic anhydride/pyridine into two isomeric 2,3-diacetoxy-1,4-dioxanes.

It is an object of the present invention to provide new nitrogen-free bleach activators for detergents where ideally all the acyl groups present have a peroxide-activating effect and industrial production is easy.

We have found that this object is achieved according to the invention by using compounds of the formula

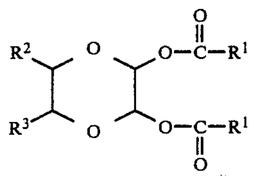

(I)

where the radicals $R^1$ are identical and each is straight-chain or branched alkyl of from 1 to 16 carbon atoms which may contain one or more olefinic double bonds and/or be substituted by carboxyl, by alkoxy of from 1 to 4 carbon atoms in the alkyl or by phenyl which may be monosubstituted or disubstituted by alkyl of from 1 to 3 carbon atoms or alkoxy of from 1 to 3 carbon atoms in the alkyl or be monosubstituted by carboxyl, wherein the carboxyl groups present are in the neutralized form, and $R^2$ and $R^3$ are identical or different and each is hydrogen, saturated straight-chain or branched alkyl of from 1 to 16 carbon atoms, the total number of carbon atoms of the two alkyls $R^2$ and $R^3$ not exceeding 16 and the alkyl radicals $R^2$ and $R^3$ may each contain as a substituent a carboxyl group, present in neutralized, partially neutralized or esterified form, or be substituted by phenyl, or be a radical of the formula

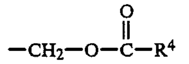

where $R^4$ is identical to $R^1$, as bleach activators for peroxides in detergents.

The particular advantages of the novel bleach activators are that virtually all the acyl groups present can be utilized as bleach activators. The products accordingly have a very powerful action.

Preference is given to using as bleach activators the compounds of the formula I where $R^1$ is $C_1$–$C_8$-alkyl, $C_3$—$C_8$—alkyl or $-(CH_2)_2-COOMe$, $-(CH_2)_3-COOMe$ $-(CH_2)_4.COOMe$ or $-CH{=}CH-COOMe$ and Me is Na, K or ammonium. Other interesting meanings of $R^1$ are phenyl and

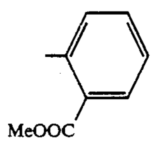

where Me is Na or K. Suitable alkyl is for example methyl, ethyl, 2-ethylhexyl, 2-propyl or 3,5,5-trimethylhexyl. In these cases, $R^2$ and $R^3$ are each hydrogen or alkyl of from 1 to16, preferably from 1 to 4, carbon atoms, e.g. methyl, ethyl, propyl, butyl, pentyl, hexyl, carboxyl, phenyl, dodecyl or hexadecyl. Particular preference is given to using those compounds of the formula I where one of $R^2$ and $R^3$ is hydrogen and the other is $C_1$–$C_{16}$-alkyl.

In accordance with the meanings mentioned and singled out, compounds of the formula I to be used according to the invention are for example:

2,3-diacetoxy-1,4-dioxane, 2,3-diacetoxy-5-methyl-1,4-dioxane, 2,3-diacetoxy-5-acetoxymethyl-1,4-dioxane, 2,3-diacetoxy-5,6-dimethyl-1,4-dioxane, 2,3-diacetoxy-5,6-benzo-1,4-dioxane, 2,3-dipivaloyl-1,4-dioxane, 2,3-dipivaloyl-5-methyl-1,4-dioxane, 2,3-diisononanoyl-1,4-dioxane, 2,3-diphenylacetoxy-1,4-dioxane, 2,3-[2-ethylhexanoyl]-1,4-dioxane, 2,3-distearyl-1,4-dioxane, 2,3-dibenzoyl-1,4-dioxane. Particular preference is given to the use of 2,3-diacetoxy-1,4-dioxane.

The compounds of the formula I are known. They are advantageously extremely simple to prepare industrially by reacting a compound of the formula

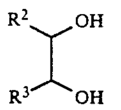

(II)

where $R^2$ and $R^3$ each have the meanings specified for $R^2$ and $R^3$ in the formula I and in addition one of $R^2$ and $R^3$ can be hydroxymethyl, with an aqueous solution of glyoxal at 20°-80° C. and pH 2-6 to give an intermediate of the formula

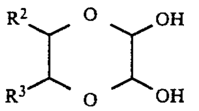

(III)

where $R^2$ and $R^3$ are as defined for the formula II, distilling the water and any solvent used out of the resulting solution under reduced pressure at 50°-80° C., and esterifying the resulting residue in a conventional manner with acetic anhydride and sodium acetate, pyridine, $H_2SO_4$ or an organic acid as catalyst.

The compounds of the formula II are preferably reacted with glyoxal in an equimolar amount. However, they can also be used in an excess of up to 50 mol %. The glyoxal is used in the form of its customary aqueous 20-50% strength by weight solution, preferably in the form of the technical grade approximately 40% strength by weight aqueous solution. The preferred temperatures for the reaction of the compounds of the formula II with glyoxal are 30°-70° C. The reaction is preferably carried out within a pH range of from 3 to 5. To maintain an adequate, or the preferred, pH range, the reaction to give the intermediate of the formula III can be carried out in the presence of an acid, such as sulfuric acid, phosphoric acid or para-toluenesulfonic acid, as catalyst. The reaction may be carried out in the presence of a solvent, such as toluene.

Advantageous process conditions for the esterification are reaction with an appropriate acyl anhydride of the formula

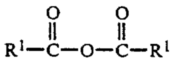

(IV)

where each $R^1$ is as defined in the formula I, for example in the presence of sulfuric acid as catalyst or in the acyl anhydride/sodium acetate or acyl anhydride/pyridine system. The esterification can of course also be carried out by reacting the compound of the formula III with an acid halide, preferably a carbonyl chloride.

The abovementioned bleach activators of the formula I are useful in particular for pulverulent or water-free liquid detergents. They are advantageously used in amounts of from 2 to 12% by weight, preferably from 4 to 8% by weight, based on the detergent. The detergent formulations are obtained by mixing the individual components or by mixing preprepared formulations. The compounds of the formula I can be used in the preparation of the detergents in the form of an aqueous solution or in powder or granule form.

The present invention therefore also provides detergents which contain a compound of the formula I as a bleach activator for peroxides. They preferably have a pulverulent or a water-free liquid formulation. Owing to the hydrolysis sensitivity of compounds of the formula (I), the detergents should contain as little free water as possible in the interests of a long shelf life. In the case of liquid detergents, this requires a virtually complete absence of water as far as is technically possible, i.e. water contents of not more than about 0.5%. In the case of pulverulent detergents, the tolerance limit for unbound water is distinctly higher, namely about 10%; any water of crystallization present in pulverulent detergents is so firmly bound as to be harmless to the compounds of the formula (I). Detergent formulations in which the bleach activators to be used according to the invention may be included may be phosphate-containing or phosphate-free. In addition to the bleach activators of the formula I the detergent contains, based on the total weight, from 6 to 25% by weight of surfactants together with further customary constituents, such as 5-50% by weight of builders with or without cobuilders, 5-35% by weight of bleaching agents and an optional 3-30% by weight of assistants, such as enzymes, foam regulators, corrosion inhibitors, fluorescent whitening agents, scents, dyes or formulation aids, for example sodium sulfate. In what follows, some customary constituents of detergent formulations will be mentioned by way of example:

Suitable surfactants are those which contain in the molecule at least one hydrophobic organic residue and a water-solubilizing anionic, zwitterionic or nonionic group. The hydrophobic residue is preferably an aliphatic hydrocarbon radical of from 8 to 26, preferably from 10 to 22, and in particular from 12 to 18, carbon atoms or an alkyl aromatic radical having from 6 to 18, preferably from 8 to 16, aliphatic carbon atoms.

Suitable synthetic anionic surfactants are in particular those of the sulfonate, sulfate or synthetic carboxylate type.

Suitable surfactants of the sulfonate type are alkylbenzenesulfonates of from 4 to 15 carbon atoms in the alkyl, mixtures of alkene- and hydroxyalkane-sulfonates, and also disulfonates as obtained for example from monoolefins containing a terminal or internal double bond by sulfonation with gaseous sulfur trioxide and subsequent alkaline or acid hydrolysis of the sulfonation products. It was also possible to use alkanesulfonates obtainable from alkanes by chlorosulfonation or sulfoxidation and subsequent hydrolysis or neutralization, or by bisulfite addition onto olefins. Other usable surfactants of the sulfonate type are the esters of α-sulfo fatty acids, for example the α-sulfonic acids of hydrogenated methyl or ethyl esters of coconut, palm kernel or tallow fatty acid.

Suitable surfactants of the sulfate type are the sulfuric monoesters of primary alcohols, for example of coconut fatty alcohols, tallow fatty alcohols or oleyl alcohol, and those of secondary alcohols. It is also possible to use sulfated fatty acid alkanolamines, fatty acid monoglycerides or reaction products of from 1 to 4 moles of ethylene oxide with primary or secondary fatty alcohols or alkylphenols.

Further suitable anionic surfactants are the fatty acid esters or amides of hydroxy- or aminocarboxylic or -sulfonic acids, such as the fatty acid sarcosides, glycolates, lactates, taurides or isothionates.

The anionic surfactants may be present in the form of their sodium, potassium or ammonium salts or as soluble salts of organic bases, such as mono-, di- or triethanolamine. Common soaps, i.e. salts of the natural fatty acids, should not be left unmentioned.

Suitable nonionic surfactants are for example addition products of from 3 to 40, preferably from 4 to 20, moles of ethylene oxide on 1 mole of fatty alcohol, alkylphenol, fatty acid, fatty amine, fatty acid amide or alkanesulfonamide. Of particular interest are the addition products of from 5 to 16 moles of ethylene oxide on coconut or tallow fatty alcohols, on oleyl alcohol or on synthetic alcohols of from 8 to 18, preferably from 12 to 18, carbon atoms, and also on mono- or dialkylphenols having from 6 to 14 carbon atoms in the alkyl radicals. However, besides these water-soluble nonionics it is also possible to use water-insoluble or sparingly water-soluble polyglycol ethers having from 1 to 4 ethylene glycol ether radicals in the molecule, in particular if used together with water-soluble nonionic or anionic surfactants.

It is also possible to use as nonionic surfactants the water-soluble addition products of ethylene oxide on polypropylene glycol ethers, alkylenediaminopolypropylene glycol and alkylpolypropylene glycols of from 1 to 10 carbon atoms in the alkyl chain which contain from 20 to 250 ethylene glycol ether groups and from 10 to 100 propylene glycol ether groups, wherein the polypropylene glycol ether chain acts as the hydrophobic residue.

It is also possible to use nonionic surfactants of the type of the amine oxides or the sulfoxides.

The foaming tendency of the surfactants can be increased or reduced by combining suitable surfactant types. A reduction is likewise possible by adding non-surfactant-type organic substances.

Suitable builder substances are for example: washing alkalis, such as sodium carbonate and sodium silicate, or complexing agents, such as phosphates, or ion exchangers, such as zeolites, and mixtures thereof. These builders have the task of eliminating the hardness ions, which come partly from the water, partly from the soil or the textile material, and augmenting the detergent action. In addition to the aforementioned builder substances, the detergent may also contain cobuilders. Cobuilders have the purpose in modern detergents of performing some of the functions of phosphates, for example sequestration, antisoil redeposition and primary and secondary detergency.

The detergent may contain for example waterinsoluble silicates as described for example in DE Patent No. 2,412,837 and/or phosphates. The group of usable phosphates comprises pyrophosphate, triphosphate, higher polyphosphates and metaphosphates. It is also possible to use phosphorus-containing organic complexing agents, such as alkane polyphosphonic acids, aminoalkane- and hydroxyalkane-polyphosphonic acids and phosphonocarboxylic acids, as further detergent ingredients. Examples of such detergent additives are the following compounds: methanediphosphonic acid, propane-1,2,3-triphosphonic acid, butane-1,2,3,4-tetraphosphonic acid, polyvinylphosphonic acid, 1-aminoethane-1,1-diphosphonic acid, 1-amino-1-phenyl-1,1-diphosphonicacid,aminotrismethylenetriphosphonic acid, methylamino- or ethylamino-bis-methylenediphosphonic acid, ethylenediaminotetramethylenetetraphosphonic acid, diethylenetriaminopentamethylenepentaphosphonic acid, 1-hydroxyethane-1,1-diphosphonic acid, phosphonoacetic or phosphonopropionic acid, copolymers of vinylphosphonic acid and acrylic and/or maleic acid, and the partially or fully neutralized salts thereof.

Further organic compounds which act as complexing agents for calcium ions and may be included in detergent formulations are polycarboxylic acids, hydroxycarboxylic acids and aminocarboxylic acids, which are usually used in the form of their water-soluble salts.

Examples of polycarboxylic acids are dicarboxylic acids of the general formula $HOOC-(CH_2)_m-COOH$ where $m=0-8$, also maleic acid, methylenemalonic acid, citraconic acid, mesaconic acid, itaconic acid, noncyclic polycarboxylic acids having 3 or more carboxyl groups in the molecule, e.g. tricarballylic acid, aconitic acid, ethylenetetracarboxylic acid, 1,1,3,3-propanetetracarboxylic acid, 1,1,3,3,5,5-pentanehexacarboxylic acid, hexanehexacarboxylic acid, cyclic di- or polycarboxylic acids, e.g. cyclopentanetetracarboxylic acid, cyclohexanehexacarboxylic acid, tetrahydrofurantetracarboxylic acid, phthalic acid, terephthalic acid, benzenetri-, -tetra- or -penta-carboxylic acid, and also mellitic acid.

Examples of hydroxymonocarboxylic or hydroxypolycarboxylic acids are glycolic acid, lactic acid, malic acid, tartronic acid, methyltartronic acid, gluconic acid, glyceric acid, citric acid, tartaric acid and salicylic acid.

Examples of aminocarboxylic acids are glycine, glyclglycine, alanine, asparagine, glutamic acid, aminobenzoic acid, iminodiacetic acid, iminotriacetic acid, hydroxyethyliminodiacetic acid, ethylenediaminotetraacetic acid, hydroxyethylethylenediaminetriacetic acid, diethylenetriaminepentaacetic acid and higher homologs preparable by polymerization of an N-aziridylcarboxylic acid derivative, for example of acetic acid, succinic acid or tricarballylic acid and subsequent hydrolysis, or by condensation of polyamines having a molecular weight of from 500 to 10,000 with salts of chloroacetic or bromoacetic acid.

Preferred cobuilder substances are polymeric carboxylic acids. This group shall be taken to include the carboxymethyl ethers of sugars, of starch and of cellulose.

Examples of particularly interesting polymeric carboxylic acids are the polymers of acrylic acid, maleic acid, itaconic acid, mesaconic acid, aconitic acid, methylenemalonic acid, citraconic acid and the like, the copolymers between these carboxylic acids, for example copolymers of acrylic acid and maleic acid (in particular those in a ratio of 70:30 having a molecular weight of 70,000), the 1:1 copolymers of maleic anhydride and methyl vinyl ether of molecular weight 70,000, and the copolymers of maleic anhydride and ethylene or propylene.

Further possible cobuilder components are antisoil redeposition agents which keep the soil detached from the fiber suspended in the liquor and thus inhibit grayness. Suitable antisoil redeposition agents/grayness inhibitors are water-soluble colloids, usually organic in nature, such as the water-soluble salts of polymeric carboxylic acids, glue, gelatin, salts of ethercarboxylic acids or ethersulfonic acids of starch or of cellulose or salts of acid sulfuric esters of cellulose or of starch. It is also possible to use for this purpose water-soluble polyamides which contain acid groups. Moreover, soluble starch products and starch preparations other than those mentioned above, for example degraded starch, aldehyde starches, etc., can be used. It is also possible to use polyvinylpyrrolidone.

Bleaching agents are in particular hydrogen peroxide and derivatives or active chlorine donor compounds. Of bleaching agents which give $H_2O_2$ in water, sodium perborate hydrates, such as $NaBO_2.H_2O_2.3H_2O$ and $NaBO_2.H_2O_2$, are particularly important. However, it is also possible to use other $H_2O_2$-providing borates. These compounds can be replaced as a whole or in part by other active oxygen carriers, in particular by peroxyhydrates such as peroxycarbonates, peroxyphosphonates, citrate perhydrates, urea-$H_2O_2$ or melamine-$H_2O_2$ compounds and by $H_2O_2$-supplying peracid salts, e.g. persulfates, perbenzoates or peroxyphthalates.

Preparation of compounds of the formula I to be used according to the invention

Bleach Activator 1

5 mol of ethylene glycol are stirred with 40% strength by weight aqueous glyoxal solution at pH 4 at 70° C. for 2 hours, and the water is then distilled off at 70° C. and 100 mbar in a rotary evaporator. The melt obtained gradually crystallizes, or can be recrystallized from ethanol. Melting point 97° C.; the yield of 594 g of 2,3-dihydroxy-1,4-dioxane corresponds to 99% of theory.

0.5 mol of dihydroxy-1,4-dioxane is slowly added with stirring to 1.1 mol of acetic anhydride together with 2 drops of $H_2SO_4$. The reaction mixture is subsequently stirred at 40° C. for 4 hours. After cooling, the reaction mixture is poured onto ice-water, and the solid substance obtained is filtered off and dried. Melting point 106° C.; the yield of 51 g of 2,3-diacetoxy-1,4-dioxane corresponds to 50% of theory.

Bleach Activator 2

1 mol of 1,2-propanediol is stirred with 40% strength by weight aqueous glyoxal solution at 50° C. for 3 hours. Water is then distilled off at 70° C. and 100 mbar, leaving 125 g (93% of theory) of 2,3-dihydroxy-5-methyl-1,4-dioxane in the form of a clear, colorless oil which crystallizes on prolonged standing.

A flask which is equipped with stirrer is charged with 0.25 mol of 2,3-dihydroxy-5-methyl-1,4-dioxane in 80 ml of pyridine which contains catalytic amounts of dimethylaminopyridine. 0.55 mol of pivaloyl chloride is added dropwise at room temperature. After 12 hours' stirring at 80° C., the reaction mixture is poured onto ice-water, and the aqueous phase is extracted three times with 100 ml of diethyl ether each time. The organic phase is then washed in succession with 150 ml of 10% strength by weight hydrochloric acid and 150 ml of 5% strength by weight sodium bicarbonate solution and is then dried, and the solvent is distilled off under reduced pressure, leaving 63 g (75% of theory) of 2,3-dipivaloyl-5-methyl-1,4-dioxane in the form of a crystalline residue which after recrystallization from methanol has a melting point of 123° C.

Bleach Activator 3

0.2 mol of 2,3-dihydroxy-1,4-dioxane prepared as described in Example 1 is esterified with 0.4 mol of isononanoyl chloride in pyridine. Working up and recrystallization from diethyl ether/methanol leaves 51 g (59% of theory) of 2,3-diisononanoyl-1,4-dioxane as a white solid. The spectroscopic data agree with the structure.

Bleach Activator 1 can also be prepared by initially introducing 1 mol of acetic anhydride and 0.05 mol of sodium acetate. 2,3-Dihydroxydioxane is then added at 40° C., and the mixture is stirred at 60° C. for 4 hours and evaporated to dryness, leaving a mixture of cis/trans-2,3-diacetoxy-1,4-dioxane in a ratio of 1:1.

The suitability of the above-prepared bleach activators is determined in washing and bleaching tests on artificially soiled cotton fabrics. The artificial soiling employed here comprises tea and red wine stains. The results are given in Table 1. The bleaching tests were carried out at 20° C., 38° C. and 60° C. The experimental conditions were as follows:

| | |
|---|---|
| washing apparatus: | Launder-O-meter |
| water hardness: | 16.8° of German hardness (Ca:Mg 4:1) |
| fabric weight: | 20 g |
| liquor volume: | 250 ml |
| detergent concentration: | 8 g/l |
| duration of wash: | 30 min |

Detergent composition (pulverulent):

| | |
|---|---|
| 6.25% | of $C_{12}$-alkylbenzenesulfonate |
| 4.7% | of tallow fatty alcohol reacted with 11 moles of ethylene oxide |
| 2.8% | of soap |
| 15% | of sodium perborate tetrahydrate |
| 7.2% | of sodium silicate |
| 3.6% | of magnesium sulfate.7 $H_2O$ |
| 1.0% | of carboxymethylcellulose |
| 0.2% | of ethylenediaminetetraacetic acid, $Na_4$salt |
| 20.0% | of zeolite A |
| 10.0% | of sodium carbonate |
| 17.5% | of sodium sulfate |
| 4% | of bleach activator |
| water | to 100% |

The bleaching effect was determined via a whiteness measurement with an Elrepho photometer. The control used was a detergent containing sodium sulfate in place of bleach activator.

The wash results all show that the activators to be used according to the invention distinctively improve the bleaching effect. The effect is very pronounced at all three of the temperatures tested. Compared with activators already being used in commercial detergents, there are distinct advantages at RT (20° C.) in the activating effect. At higher wash temperatures, the action is better than that of ISONOBS (sodium salt of 3,5,5-trimethylhexanoylbenzenesulfonic acid). Results comparable to those obtained with TAED are not obtainable at the same concentration.

TABLE 1

| | % Reflectance | | | | | |
|---|---|---|---|---|---|---|
| | 20° C. | | 38° C. | | 60° C. | |
| | Tea | Red wine | Tea | Red wine | Tea | Red wine |
| 1. Without activator | 57.1 | 62.2 | 63.3 | 65.3 | 66.5 | 68.6 |
| Bleach activator 1 | 59.7 | 63.6 | 66.1 | 66.6 | 69.3 | 70.5 |
| 2. Without activator | 58.2 | 56.7 | 60.4 | 60.6 | 68.0 | 66.4 |
| Bleach activator 3 | 58.9 | 59.0 | 61.4 | 62.2 | 69.0 | 67.8 |
| 3. Without activator | 62.4 | 54.5 | 73.3 | 59.5 | 80.1 | 68.6 |
| Bleach activator 1 | 68.2 | 56.8 | 75.4 | 62.9 | 80.9 | 72.1 |
| TAED[1] | 65.5 | 55.7 | 77.1 | 65.5 | 82.5 | 75.8 |
| ISONOBS[2] | 65.7 | 54.6 | 76.0 | 61.0 | 81.3 | 69.9 |

[1]TAED = tetraacetylethylenediamine
[2]ISONOBS = sodium salt of isononanoyloxybenzenesulfonic acid

We claim:

1. A pulverulent or water-free liquid detergent which contains a surfactant, a builder and a bleaching agent as essential constituents, additionally containing a compound of the formula I

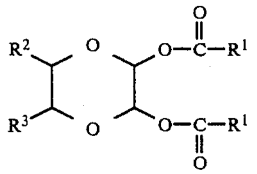

(I)

where the radicals $R^1$ are identical and each is straight-chain or branched alkyl of from 1 to 16 carbon atoms which may contain one or more olefinic double bonds and/or be substituted by carboxyl, by alkoxy of from 1 to 4 carbon atoms in the alkyl or by phenyl which may be monosubstituted or disubstituted by alkyl of from 1 to 3 carbon atoms or alkoxy of from 1 to 3 carbon atoms in the alkyl or be monosubstituted by carboxyl, wherein the carboxyl groups present are in the neutralized form, and $R^2$ and $R^3$ are identical or different and each is hydrogen, saturated straight-chain or branched alkyl of from 1 to 16 carbon atoms, the total number of carbon atoms of the two alkyls $R^2$ and $R^3$ not exceeding 16 and the alkyl radicals $R^2$ and $R^3$ may contain as a substituent a carboxyl group, present in neutralized, partially neutralized or esterified form, or be substituted by phenyl, or be a radical of the formula

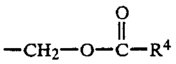

where $R^4$ is identical to $R^1$, in an effective amount as a bleach activator for peroxide.

2. A pulverulent or water-free liquid detergent as claimed in claim 1, wherein in the compound of the formula I used $R^1$ is $C_1$–$C_8$-alkyl, $C_3$–$C_8$-alkenyl, $-(CH_2)_2-COOMe$, $-(CH_2)_3-COOMe$, $-(CH_2)_4-COOMe$, $-CH{=}CH-COOMe$,

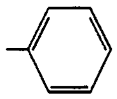

or

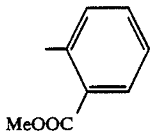

Me is Na, K or ammonium and $R^2$ and $R^3$ are each H or $C_1$—$C_{16}$-alkyl.

3. A pulverulent or water-free liquid detergent as claimed in claim 1, wherein in the compound of the formula I used $R^1$ is $C_1$–$C_8$-alkyl and $R^2$ and $R^3$ are each H.

4. A pulverulent or water-free liquid detergent as claimed in claim 1, wherein the compound of the formula I is used in an amount of from 2 to 12% by weight, based on the detergent.

* * * * *